(12) United States Patent
Paczkowski et al.

(10) Patent No.: US 8,752,140 B1
(45) Date of Patent: Jun. 10, 2014

(54) SYSTEM AND METHODS FOR TRUSTED INTERNET DOMAIN NETWORKING

(75) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/610,856

(22) Filed: Sep. 11, 2012

(51) Int. Cl.
*G06F 7/04* (2006.01)

(52) U.S. Cl.
USPC ............ 726/4; 726/1; 726/3; 726/5; 713/168; 713/170

(58) Field of Classification Search
CPC ..... H04L 61/2015; H04L 63/08; H04W 8/26; H04W 12/06; H04W 80/04; H04W 76/02; G06F 9/44505
USPC ............................ 726/1, 3, 4, 5; 713/168, 170
See application file for complete search history.

(56) References Cited

U.S. PATENT DOCUMENTS

| | | | |
|---|---|---|---|
| 5,303,378 A | | 4/1994 | Cohen |
| 6,668,322 B1 | | 12/2003 | Wood et al. |
| 6,823,454 B1 | * | 11/2004 | Hind et al. ................... 713/168 |
| 6,824,064 B2 | | 11/2004 | Guthery et al. |
| 6,895,234 B1 | | 5/2005 | Laursen et al. |
| 7,650,645 B1 | | 1/2010 | Langendorf et al. |
| 7,873,837 B1 | | 1/2011 | Lee et al. |
| 7,895,642 B1 | * | 2/2011 | Larson et al. ................ 726/3 |
| 8,238,823 B2 | | 8/2012 | Maugars et al. |
| 8,494,576 B1 | | 7/2013 | Bye et al. |
| 8,504,097 B1 | | 8/2013 | Cope et al. |
| 8,649,770 B1 | | 2/2014 | Cope et al. |
| 8,667,607 B2 | | 3/2014 | Paczkowski et al. |
| 2002/0098389 A1 | | 7/2002 | Gaines |
| 2002/0174344 A1 | | 11/2002 | Ting |
| 2002/0184325 A1 | | 12/2002 | Killcommons et al. |
| 2002/0194496 A1 | | 12/2002 | Griffin et al. |
| 2003/0126225 A1 | | 7/2003 | Camble et al. |

(Continued)

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |

OTHER PUBLICATIONS

FAIPP Pre-Interview Communication dated Oct. 24, 2012, U.S. Appl. No. 13/463,797, filed May 3, 2012.

(Continued)

*Primary Examiner* — Brian Shaw

(57) ABSTRACT

A method of performing a trusted dynamic host configuration protocol (DHCPT). The method comprises receiving a trusted dynamic host configuration protocol request message, wherein the request message was created in and transmitted from a trusted security zone of a computing device, and wherein the request message requests an internet protocol (IP) address and routing information for the computing device, allocating an internet protocol address and determining routing information for the computing device, wherein the allocating and determining are performed by a dynamic host configuration protocol server while executing in a trusted security zone of the server, and transmitting the internet protocol address and routing information to the computing device over a trusted end-to-end communication link.

11 Claims, 8 Drawing Sheets

(56) References Cited

U.S. PATENT DOCUMENTS

| | | | |
|---|---|---|---|
| 2004/0243810 A1 | 12/2004 | Rindborg et al. | |
| 2005/0015601 A1 | 1/2005 | Tabi | |
| 2005/0138433 A1 | 6/2005 | Linetsky | |
| 2005/0235166 A1 | 10/2005 | England et al. | |
| 2006/0036851 A1 | 2/2006 | DeTreville | |
| 2006/0212853 A1 | 9/2006 | Sutardja | |
| 2006/0224901 A1 | 10/2006 | Lowe | |
| 2006/0261949 A1 | 11/2006 | Kim et al. | |
| 2006/0277433 A1 | 12/2006 | Largman et al. | |
| 2007/0061535 A1 | 3/2007 | Xu et al. | |
| 2007/0079120 A1 | 4/2007 | Bade et al. | |
| 2007/0094273 A1 | 4/2007 | Fritsch et al. | |
| 2007/0177771 A1 | 8/2007 | Tanaka et al. | |
| 2007/0180120 A1* | 8/2007 | Bainbridge et al. | 709/226 |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0276969 A1 | 11/2007 | Bressy et al. | |
| 2007/0277223 A1 | 11/2007 | Datta et al. | |
| 2008/0014867 A1 | 1/2008 | Finn | |
| 2008/0022374 A1 | 1/2008 | Brown et al. | |
| 2008/0092213 A1* | 4/2008 | Wei et al. | 726/4 |
| 2008/0097793 A1 | 4/2008 | Dicks et al. | |
| 2008/0121687 A1 | 5/2008 | Buhot | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |
| 2008/0212503 A1* | 9/2008 | Lipford et al. | 370/310 |
| 2009/0055278 A1 | 2/2009 | Nemani | |
| 2009/0070272 A1 | 3/2009 | Jain | |
| 2009/0113425 A1 | 4/2009 | Ports et al. | |
| 2009/0182634 A1 | 7/2009 | Park et al. | |
| 2009/0193491 A1 | 7/2009 | Rao | |
| 2009/0281947 A1 | 11/2009 | Erel | |
| 2009/0300599 A1 | 12/2009 | Piotrowski | |
| 2009/0320028 A1 | 12/2009 | Gellerich et al. | |
| 2010/0031325 A1 | 2/2010 | Maigne et al. | |
| 2010/0052844 A1 | 3/2010 | Wesby | |
| 2010/0128598 A1 | 5/2010 | Gandhewar et al. | |
| 2010/0142517 A1 | 6/2010 | Montemurro et al. | |
| 2010/0153721 A1 | 6/2010 | Mellqvist | |
| 2010/0162028 A1 | 6/2010 | Frank et al. | |
| 2010/0223348 A1 | 9/2010 | Przybysz et al. | |
| 2010/0228937 A1 | 9/2010 | Bae et al. | |
| 2010/0241847 A1 | 9/2010 | van der Horst et al. | |
| 2010/0274726 A1 | 10/2010 | Florek et al. | |
| 2010/0281139 A1 | 11/2010 | Deprun | |
| 2010/0318802 A1 | 12/2010 | Balakrishnan | |
| 2011/0014948 A1 | 1/2011 | Yeh | |
| 2011/0021175 A1 | 1/2011 | Florek et al. | |
| 2011/0035604 A1 | 2/2011 | Habraken | |
| 2011/0078081 A1 | 3/2011 | Pirzadeh et al. | |
| 2011/0082711 A1 | 4/2011 | Poeze et al. | |
| 2011/0112968 A1 | 5/2011 | Florek et al. | |
| 2011/0202916 A1 | 8/2011 | VoBa et al. | |
| 2011/0212707 A1 | 9/2011 | Mahalal | |
| 2011/0226853 A1 | 9/2011 | Soh et al. | |
| 2011/0237190 A1 | 9/2011 | Jolivet | |
| 2011/0238992 A1 | 9/2011 | Jancula et al. | |
| 2011/0281558 A1 | 11/2011 | Winter | |
| 2011/0294418 A1 | 12/2011 | Chen | |
| 2012/0011572 A1 | 1/2012 | Chew et al. | |
| 2012/0021683 A1 | 1/2012 | Ma et al. | |
| 2012/0028575 A1 | 2/2012 | Chen et al. | |
| 2012/0029997 A1 | 2/2012 | Khan et al. | |
| 2012/0036347 A1 | 2/2012 | Swanson et al. | |
| 2012/0052801 A1 | 3/2012 | Kulkarni | |
| 2012/0072481 A1 | 3/2012 | Nandlall et al. | |
| 2012/0072979 A1 | 3/2012 | Cha et al. | |
| 2012/0084211 A1 | 4/2012 | Petrov et al. | |
| 2012/0084438 A1 | 4/2012 | Raleigh et al. | |
| 2012/0084836 A1 | 4/2012 | Mahaffey et al. | |
| 2012/0089700 A1 | 4/2012 | Safruti et al. | |
| 2012/0123868 A1 | 5/2012 | Brudnicki et al. | |
| 2012/0130839 A1 | 5/2012 | Koh et al. | |
| 2012/0131178 A1 | 5/2012 | Zhu et al. | |
| 2012/0143703 A1 | 6/2012 | Wall et al. | |
| 2012/0149327 A1 | 6/2012 | Raboisson et al. | |
| 2012/0158467 A1 | 6/2012 | Hammad et al. | |
| 2012/0159163 A1 | 6/2012 | von Behren et al. | |
| 2012/0159612 A1 | 6/2012 | Reisgies | |
| 2012/0178365 A1 | 7/2012 | Katz et al. | |
| 2012/0178366 A1 | 7/2012 | Levy et al. | |
| 2012/0190332 A1 | 7/2012 | Charles | |
| 2012/0198519 A1* | 8/2012 | Parla et al. | 726/3 |
| 2012/0202423 A1 | 8/2012 | Tiedemann et al. | |
| 2012/0226582 A1 | 9/2012 | Hammad | |
| 2012/0226772 A1 | 9/2012 | Grube et al. | |
| 2012/0238206 A1 | 9/2012 | Singh et al. | |
| 2012/0252480 A1 | 10/2012 | Krutt et al. | |
| 2012/0258690 A1 | 10/2012 | Chen et al. | |
| 2012/0266076 A1 | 10/2012 | Lockhart et al. | |
| 2012/0266220 A1 | 10/2012 | Brudnicki et al. | |
| 2012/0284195 A1 | 11/2012 | McMillen et al. | |
| 2012/0295588 A1 | 11/2012 | Chen et al. | |
| 2012/0297187 A1 | 11/2012 | Paya et al. | |
| 2012/0303961 A1 | 11/2012 | Kean et al. | |
| 2012/0304286 A1 | 11/2012 | Croll et al. | |
| 2012/0324293 A1 | 12/2012 | Grube et al. | |
| 2013/0014259 A1 | 1/2013 | Gribble et al. | |
| 2013/0047197 A1 | 2/2013 | Saroiu et al. | |
| 2013/0054474 A1 | 2/2013 | Yeager | |
| 2013/0062417 A1 | 3/2013 | Lee et al. | |
| 2013/0086684 A1 | 4/2013 | Mohler | |
| 2013/0097302 A9 | 4/2013 | Khedouri et al. | |
| 2013/0109307 A1 | 5/2013 | Reisgies et al. | |
| 2013/0117186 A1 | 5/2013 | Weinstein et al. | |
| 2013/0138521 A1 | 5/2013 | Want et al. | |
| 2013/0138959 A1 | 5/2013 | Pelly et al. | |
| 2013/0140360 A1 | 6/2013 | Graylin | |
| 2013/0143489 A1 | 6/2013 | Morris et al. | |
| 2013/0145429 A1 | 6/2013 | Mendel et al. | |
| 2013/0159186 A1 | 6/2013 | Brudnicki et al. | |
| 2013/0159710 A1 | 6/2013 | Khan | |
| 2013/0160120 A1 | 6/2013 | Malaviya et al. | |
| 2013/0174147 A1 | 7/2013 | Sahita et al. | |
| 2013/0305333 A1 | 11/2013 | Katzer et al. | |
| 2013/0345530 A1 | 12/2013 | McRoberts et al. | |
| 2014/0033316 A1 | 1/2014 | Paczkowski et al. | |
| 2014/0047548 A1 | 2/2014 | Bye et al. | |

OTHER PUBLICATIONS

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Cope, Warren B., et al., "Electronic Purchase Transaction Trust Infrastructure", filed May 29, 2012, U.S. Appl. No. 13/482,731.

Cope, Warren B., et al., "Alternative hardware and Software Configuration for Near Field Communication", filed May 4, 2012, U.S. Appl. No. 13/463,797.

(56) References Cited

OTHER PUBLICATIONS

Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
Mcroberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated Nov. 29, 2013, U.S. Appl. No. 13/440,980, filed Apr. 5, 2012.
Office Action dated Dec. 19, 2013, U.S. Appl. No. 13/557,213 filed Jul. 25, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.

\* cited by examiner

SYSTEM AND METHODS FOR TRUSTED INTERNET DOMAIN NETWORKING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers may communicate based on network routing protocols such as the internet protocol (IP). A computer may connect to the Internet by first requesting that a dynamic address be provided to the computer, for example a dynamic internet protocol address or IP address. The computer may request content based on an address, for example an IP address, of a content server. Because human beings do not readily memorize and/or key in long strings of numbers, the content server may be identified by a domain name, and a domain name system (DNS) server may automatically translate this domain name to an IP address. The request for content may then be carried out using the IP address.

SUMMARY

In an embodiment, a method of performing a trusted dynamic host configuration protocol (DHCPT) is disclosed. The method comprises receiving a trusted dynamic host configuration protocol request message, wherein the request message was created in and transmitted from a trusted security zone of a computing device, and wherein the request message requests an internet protocol (IP) address and routing information for the computing device, allocating an internet protocol address and determining routing information for the computing device, wherein the allocating and determining are performed by a dynamic host configuration protocol server while executing in a trusted security zone of the server, and transmitting the internet protocol address and routing information to the computing device over a trusted end-to-end communication link.

In an embodiment, a method of performing a trusted dynamic host configuration protocol (DHCPT) is disclosed. The method comprises receiving a trusted dynamic host configuration protocol request message, wherein the request message was created in and transmitted from a trusted security zone of a computing device, and wherein the request message requests a trusted internet protocol (IP) address and trusted internet domain routing information for the computing device, allocating a trusted internet protocol address and determining trusted internet domain routing information for the computing device, wherein the allocating and determining are performed by a dynamic host configuration protocol server while executing in a trusted security zone of the server, and transmitting the trusted internet protocol address and trusted internet domain routing information to the computing device over a trusted end-to-end communication link. The trusted internet protocol address is one of a plurality of trusted internet protocol addresses that are not accessible to computing devices that are not coupled to a trusted internet domain, and the trusted internet domain routing information comprises trusted internet protocol addresses of trusted network nodes that promote routing in the trusted internet domain.

In an embodiment, a method of translating a domain name to an internet protocol address of a trusted host is disclosed. The method comprises receiving a translation request message requesting translation of a domain name that is associated with a trusted host to an internet protocol address, wherein the host provides at least of one of trusted services or trusted access to content, verifying that the translation request message was sent via a trusted end-to-end communication link, translating the domain name to an internet protocol address of the trusted host, and transmitting the internet protocol address of the trusted host over a trusted end-to-end communication link. Verifying, translating, and transmitting are performed by a domain name system (DNS) server executing in a trusted security zone.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
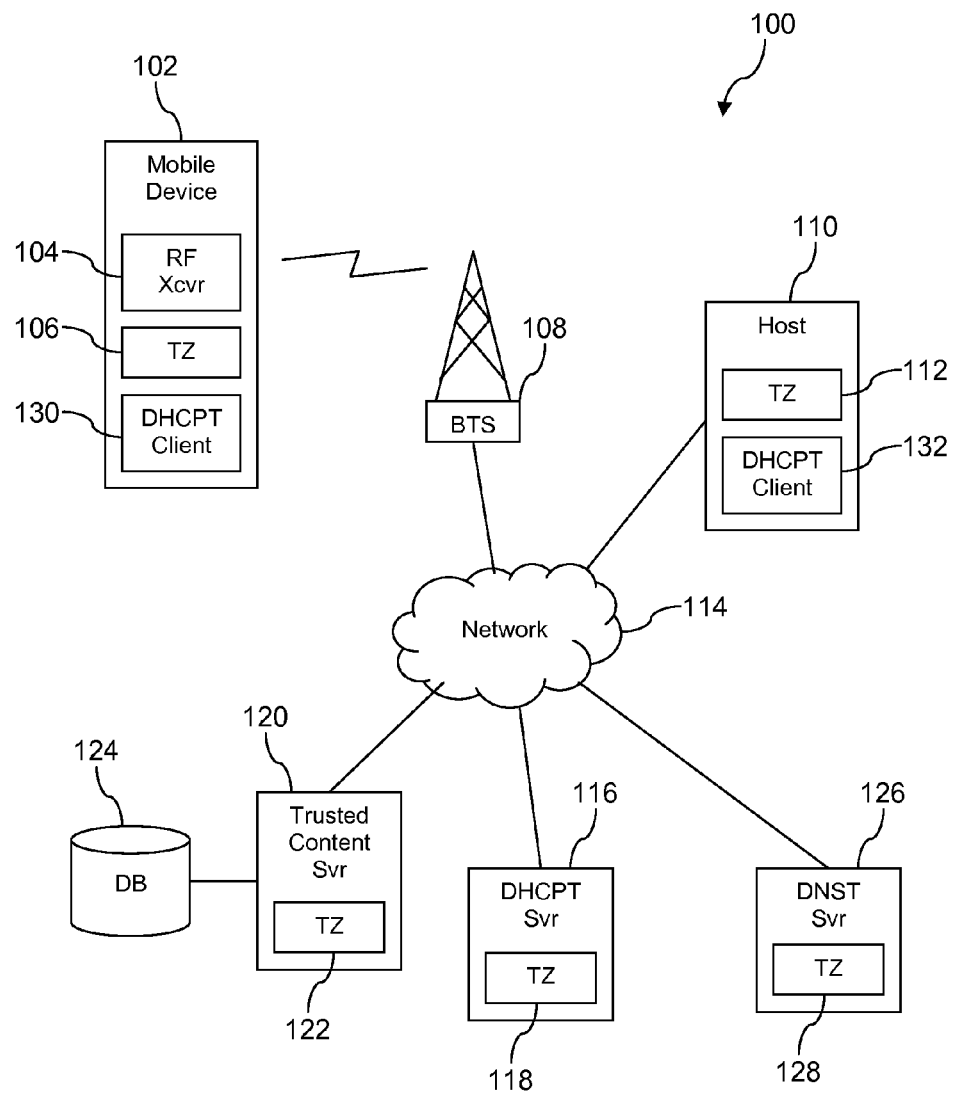
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Systems and methods for conducting trusted internetworking are described herein. A trusted dynamic host configuration protocol (DHCPT) server is described that reduces the risks of a fraudulent dynamic host configuration protocol (DHCP) server sending an unsuspecting host or mobile device that has requested an IP address and routing information to spurious hosts or servers as well as reduces the risk of unauthorized clients getting access to an Internet or subnet that they should not access. The trusted dynamic host configuration protocol server may receive a request from a host, for example a desktop computer or a mobile device, for an IP address and routing information. The trusted dynamic host configuration protocol server may send back a message to the requesting host asking if the host can participate in a trusted session. If the requesting host or mobile device replies with a request for an IP address and routing information in a trusted mode, the trusted dynamic host configuration protocol server completes the request using a trusted session, otherwise the dynamic host configuration protocol server completes the request using a normal session.

In an embodiment, a host having a trusted security zone may send the request message while executing in its trusted security zone and associate a trust token with the request message. The trusted dynamic host configuration protocol server examines one or more trust tokens that may be associated with the request message to confirm a continuity of trust of the request message. A continuity of trust may be provided by transporting, handling and/or processing the subject message only by applications executing in trusted security zones of one or more computer platforms and/or network nodes. The continuity of trust of the request message may be provided by transmitting the request message via a trusted end-to-end communication link. For further details about establishing trusted end-to-end communication links, see U.S. patent application Ser. No. 13/532,588, filed Jun. 25, 2012, entitled "End-to-end Trusted Communications Infrastructure," by Michael McRoberts, et al., which is incorporated by reference in its entirety.

If the continuity of trust is confirmed, the trusted dynamic host configuration protocol server determines an appropriate IP address and routing information for the requesting host and transmits this information back to the requesting host in a response message. The trusted dynamic host configuration protocol server executes these actions in its own trusted security zone and associates a trust token with the response message. The requesting host, executing in its trusted security zone, examines one or more trust tokens that may be associated with the response message to confirm a continuity of trust of the response message. Trusted security zones will be discussed further hereinafter. In an embodiment, the IP address returned by the trusted dynamic host configuration protocol server is a trusted IP address, where the trusted IP address is one of a plurality of trusted IP addresses that are hidden from or are otherwise not accessible to computing devices and/or hosts that are not coupled to a trusted internet domain A trusted domain name system (DNST) server is described that reduces risks associated with domain name translations provided by a possibly corrupted domain name system server. In an embodiment, the trusted domain name system server receives a translation request message that is sent by a host executing in a trusted security zone of the host. The trusted domain name system server performs the requested translation and transmits the translation response to the requesting host while executing in a trusted security zone of the trusted domain name system server. The requesting host receives the translation response while executing in the trusted security zone of the host. The trusted domain name system server may receive messages defining new translation mappings. In an embodiment, the trusted domain name system server may distinguish between trusted translation mappings that are associated with a trusted end-point and normal translation mappings that are associated with a normal end-point. The trusted translation mappings are processed by the trusted domain name system server while executing in a trusted security zone of the server.

In an embodiment, the translation request may be transmitted by the requesting host to the trusted domain name system server over a trusted end-to-end communication link. The requesting host may create and associate a trust token with the translation request message. The trusted domain name system server examines one or more trust tokens associated with the request message to validate a continuity of trust of the translation request message. The continuity of trust may be provided by the requesting host transmitting the translation request message over a trusted end-to-end communication link. If the continuity of trust is confirmed, the domain name system server performs the requested translation, builds the translation response message, builds a trust token, and sends the translation response message and associated trust token to the requesting host, while the server executes in its trusted security zone. The requesting host examines one or more trust tokens associated with the translation response message to validate the continuity of trust of the translation response message.

In an embodiment, a trusted domain name system server may process both normal translation requests and trusted translation requests. Alternatively, in an embodiment, a trusted domain name system may process only trusted translation requests sent by requesting hosts executing in their trusted security zones and sent via a trusted end-to-end communication link. In an embodiment, the trusted domain system server may provide translations of domain names to trusted internet protocol addresses. The present disclosure contemplates the trusted domain name system servers promoting a new set of top level domain names and/or category of domain names that are trusted. These trusted top level domain names may have identifiers such as ".tgov," ".tcom," ".tedu," ".tnet," ".tru," and other such domain identifiers, each of which incorporate the letter 't' to designate their trusted property. It is understood that domain names in the top level domains such as ".tgov," ".tcom," ".tedu," ".tnet," ".tru" would translate to trusted IP addresses.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs, for example both in mobile devices and in desktop computers. Providing the trusted security zone in the device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the device's normal operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones, laptops, and tablets as well as extending to other trusted devices such as desktop personal computers, servers, sensors, medical devices, point-of-sale terminals, machine-to-machine (M2M) communication devices, industrial automation, handheld terminals, automotive, etc.

The trusted security zone is implemented by partitioning all of the hardware and software resources of the device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the device's normal operating system that executes in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system, which may be referred to in some contexts as the trusted operating system, that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system (which may also be referred to as a trusted operating system) runs in a virtual processor separate from the normal partition operating system that likewise executes in its own virtual processor. Users may install applications on the device that may execute in the normal partition operating system described above. The trusted security zone runs a separate operating system (which may also be referred to as a trusted operating system) for the secure partition that is installed by the device manufacturer or vendor, and users are not able to install new applications in or alter the contents of the trusted security zone.

Turning now to FIG. 1, a communication system 100 is described. In an embodiment, system 100 comprises a mobile device 102, a base transceiver station 108, a host computer 110, a network 114, a trusted dynamic host configuration protocol (DHCPT) server 116, a trusted content server 120, a data store 124, and a trusted domain name system (DNST) server 126. The mobile device 102 comprises a radio transceiver 104 and a first trusted security zone 106. The mobile device 102 may be a mobile phone, a personal digital assistant (PDA), a media player, a laptop computer, a tablet computer, a notebook computer, or other electronic device having a radio communication capability. Structures and architectures for implementing mobile devices are discussed in more detail herein after. The host 110 comprises a second trusted security zone 112. The host 110 may be a desktop computer or some other computing device that has a wired connection to the network 114. Computers are discussed in more detail herein after.

The base transceiver station 108 provides a wireless communication link to the mobile device 102 according to at least one of a code division multiple access (CDMA), a global system for mobile communication (GSM), a long term evolution (LTE), a worldwide interoperability for microwave access (WiMAX), or another wireless communication protocol. In an embodiment, the base transceiver station 108 may be a femtocell. The base transceiver station 108 couples the mobile device 102 to the network 114. Alternatively, in an embodiment, the mobile device 102 may be coupled to the network 114 by a wireless access point, for example a WiFi wireless access point or a Bluetooth access point.

It is understood that the system 100 may comprise any number of mobile devices 102, base transceiver stations 108, wireless access points, hosts 110, trusted dynamic host configuration protocol servers 116, trusted content servers 120, data stores 124, and trusted domain name system servers 126. Also, it is understood that the communication system 100 may not comprise each of the mobile device 102, the host 110, the trusted dynamic host configuration protocol server 116, the trusted content server 120, and the trusted domain name system server 126. For example, in an embodiment, the system 100 may not have a trusted domain name system server 126. For example, in an embodiment, the system 100 may not have a trusted dynamic host configuration protocol server 116. For example, in an embodiment, the system 100 may not have a trusted content server 120.

The trusted dynamic host configuration protocol server 116 comprises a third trusted security zone 118. In an embodiment, the trusted dynamic host configuration protocol server 116 provides normal and trusted dynamic host configuration protocol functionality. Alternatively, the trusted dynamic host configuration protocol server 116 provides only trusted dynamic host configuration protocol functionality. When the mobile device 102 sends a request message from a dynamic host configuration protocol client to the trusted dynamic host configuration protocol server 116, the trusted dynamic host configuration protocol server 116 may query whether the mobile device 102 wishes to complete the dynamic host configuration protocol function as a trusted client.

If the mobile device 102 comprises a trusted dynamic host configuration protocol client 130 and the mobile device 102 wishes, it may execute at least a portion of the dynamic host configuration protocol client 130 in the first trusted security zone 106. The first trusted security zone 106 and/or the dynamic host configuration protocol client 130 creates a request message and a trust token and sends the request message and trust token to the trusted dynamic host configuration protocol server 116.

The trusted dynamic host configuration protocol server 116 examines one or more trust tokens that are received with the request message to confirm a continuity of trust. If the continuity of trust is confirmed, the trusted dynamic host configuration server 116 allocates an internet protocol address for use by the mobile device 102 and determines routing information for the mobile device 102, builds a response message comprising the internet protocol address for use by the mobile device 102 and the routing information, builds a trust token, and sends the response message and the trust token to the mobile device 102. The routing information may comprise one or more internet protocol addresses of domain name system servers and other network nodes that provide services related to network routing. In an embodiment, the internet protocol address for use by the mobile device 102 returned in the response message may be a trusted internet protocol address. In an embodiment, the routing information may comprise one or more trusted internet protocol addresses of trusted domain name system servers, for example the domain name system server 126. These operations by the trusted dynamic host configuration server 116 are performed while executing in the third trusted zone 118.

After receiving the response message, the first trusted security zone 106 and/or the trusted dynamic host configuration protocol client 130 examines one or more trust tokens that are received with the response message to confirm a continuity of trust. If the continuity of trust is confirmed, the trusted dynamic host configuration protocol client 130 configures the mobile device 102 appropriately with the internet protocol address and the routing information received in the reply message.

The interaction between the mobile device 102 and the trusted dynamic host configuration protocol server 116 may be conducted in a substantially similar manner between the host 110 and the trusted dynamic host configuration protocol server 116. If the host 110 comprises a second trusted dynamic host configuration protocol client 132 and the host 110 wishes, it may execute at least a portion of the dynamic host configuration protocol client 132 in the second trusted security zone 112. The second trusted security zone 112 and/or the second dynamic host configuration protocol client 132 creates a request message and a trust token and sends the request message and trust token to the trusted dynamic host configuration protocol server 116.

In an embodiment, the trusted content server 120 has a fourth trusted security zone 122 and a trusted internet protocol address and is only accessible from a mobile device 102 or a host 110 that is likewise configured with a trusted internet protocol address. The mobile device 102 may create a content request message while executing in the first trusted zone 106, create a trust token, and send the content request message and trust token over a trusted end-to-end communication link to the trusted content server 120. The trusted content server 120, while executing in the fourth trusted security zone 122, receives the content request message and one or more trust tokens and confirms the trust continuity of the content request message. If the trust continuity is confirmed, the trusted content server 120, while executing in the fourth trusted security zone 122, retrieves the requested content from the data store 124, creates a trust token, and sends a content response message and the trust token over a trusted end-to-end communication link to the mobile device 102, where the content response message may comprise the requested content. The mobile device 102 receives the content response message and one or more trust tokens and analyzes the trust token or trust tokens to confirm the trust continuity of the content response. If the trust continuity is confirmed, the mobile device 102 consumes the trusted content. The actions performed by the mobile device 102 and by the trusted content server 120 described above are performed at least in part in the first trusted security zone 106 and the fourth trusted security zone 122.

In an embodiment, trusted domain name system server 126 comprises a fifth trusted security zone 128 and translates both domain names to standard internet protocol addresses and trusted domain names to trusted internet protocol addresses. When the trusted domain name system server 126 receives a translation request for a domain name that maps to a trusted internet protocol address, the trusted domain name system server 126 conducts the translation in a trusted manner. The mobile device 102 may then execute in the first trusted security zone 106, build a translation request message and a trust token, and send the translation request message and the trust token to the trusted domain name system server 126 via a trusted end-to-end communication link.

The trusted domain name system server 126 executing in the fifth trusted security zone 128 receives the translation request message and one or more trust tokens and examines the one or more trust tokens to confirm a continuity of trust of the translation request message. If the continuity of trust is confirmed, the trusted domain name server 126, while executing in the fifth trusted security zone 128, translates the domain name to a trusted internet protocol address, builds a translation response message containing the trusted internet protocol address and a trust token, and sends the translation response message and trust token to the mobile device 102 over a trusted end-to-end communication link. The mobile device 102 executing in the first trusted security zone 106 receives the translation response message and one or more trust tokens and examines the one or more trust tokens to confirm a continuity of trust of the translation response message. If the continuity of trust is confirmed, the mobile device 102 consumes the trusted internet protocol address, for example to request trusted content from the trusted content server 120 or some other action. The trusted domain name system server 126 may receive requests to add or change domain name system translations. In an embodiment, the trusted domain name system server 126 accepts requests to add or change domain name system translations only from devices executing in a trusted security zone and when received over a trusted end-to-end communication link.

In an embodiment, the trusted domain name system server 126 may handle only translations of trusted domain names, for example names that are associated with trusted top level domains such as ".tgov," ".tcom," ".tedu," ".tnet," ".tru," and other such domain identifiers, each of which incorporate the letter 't' to designate their trusted property. The internet protocol addresses associated with trusted top level domains may be trusted internet protocol addresses.

Figure 2:
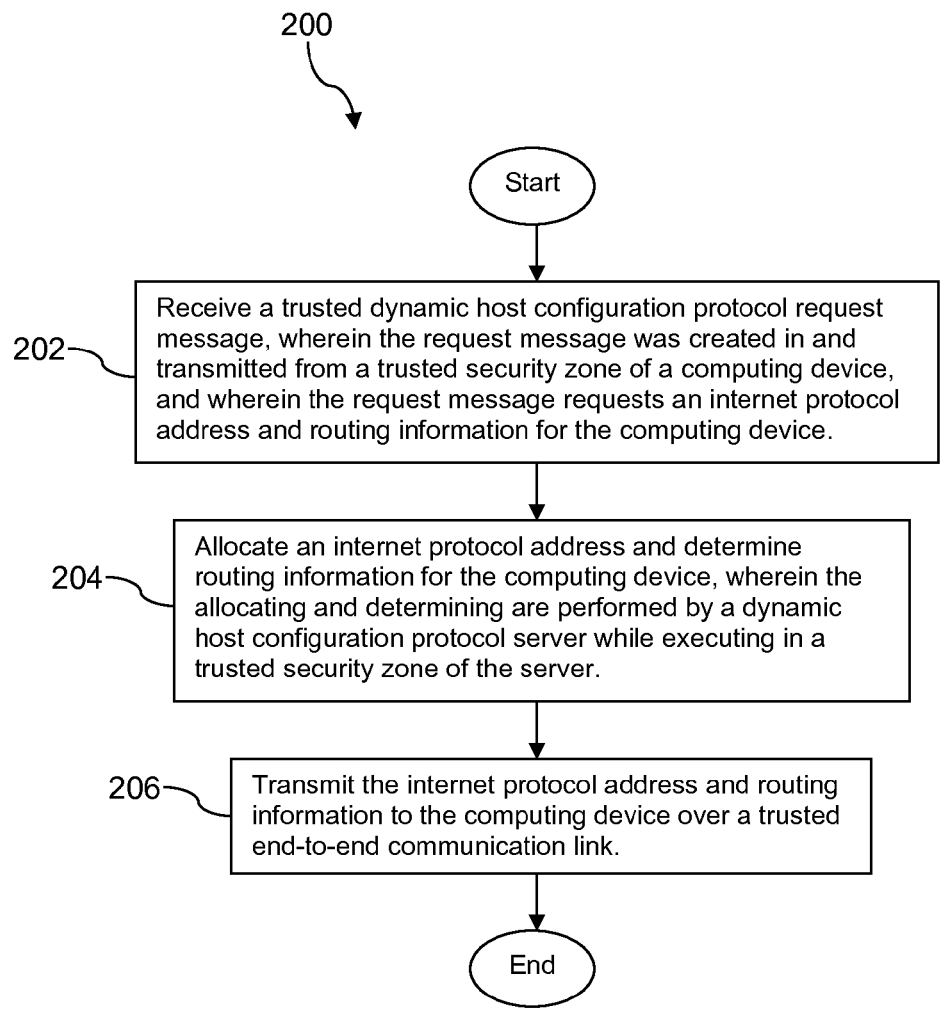
FIG. 2 is a flow chart of a method according to an embodiment of the disclosure.

Turning now to FIG. 2, a method 200 is described. In an embodiment, the method 200 may be performed by a trusted dynamic host configuration protocol server. At block 202, receive a trusted dynamic host configuration protocol request message, wherein the request message was created in and transmitted from a trusted security zone of a computing device, and wherein the request message requests an internet protocol address and routing information for the computing device. The processing of block 202 may further comprise confirming a continuity of trust of the request message as described further above. The processing of block 202 may be performed while executing, at least in part, in a trusted security zone, for example a trusted security zone of a dynamic host configuration protocol server. At block 204, allocate an internet protocol address and determine routing information for the computing device. The allocating and determining processing of block 204 may be performed while executing in a trusted security zone, for example a trusted security zone of a dynamic host configuration protocol server. At block 206, transmit the internet protocol address and routing information to the computing device over a trusted end-to-end communication link. In an embodiment, the internet protocol address may be a trusted internet protocol address, and some of the routing information may comprise trusted internet protocol addresses, for example a trusted internet protocol address of one or more trusted domain name system servers. It is understood that the computing platform that executes method 200 may also perform normal or untrusted dynamic host configuration protocol operations when interworking with some mobile devices and/or host computers that may not have a trusted security zone. In an embodiment, the processing of block 206 may be performed while executing in a trusted security zone.

Figure 3:
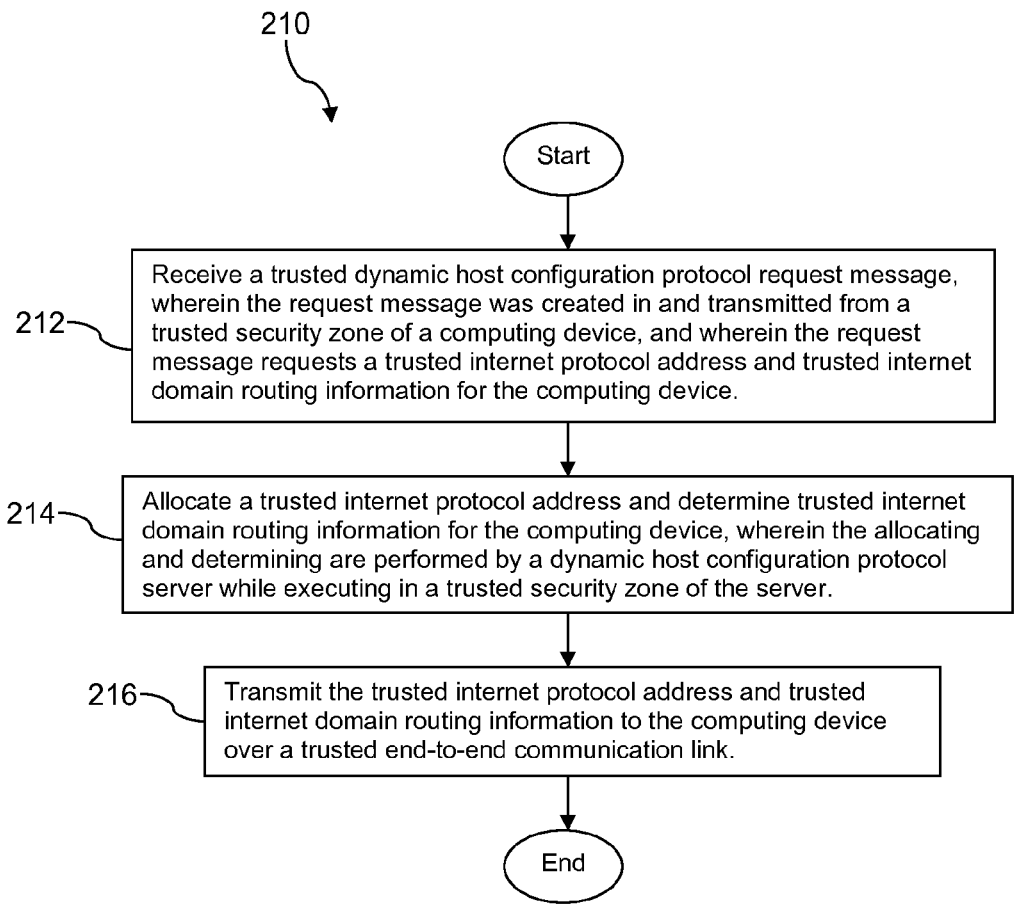
FIG. 3 is a flow chart of another method according to an embodiment of the disclosure.

Turning now to FIG. 3, a method 210 is described. In an embodiment, the method 210 may be performed by a trusted dynamic host configuration protocol server. At block 212, receive a trusted dynamic host configuration protocol request message, wherein the request message was created in and transmitted from a trusted security zone of a computing device, and wherein the request message requests a trusted internet protocol address and trusted internet domain routing information for the computing device. The processing of block 212 may be performed while executing, at least in part, in a trusted security zone, for example a trusted security zone of a dynamic host configuration protocol server. At block 214, allocate a trusted internet protocol address and determine trusted internet domain routing information for the computing device. The allocating and determining processing of block 214 may be performed while executing in a trusted security zone, for example a trusted security zone of a dynamic host configuration protocol server. At block 216, transmit the trusted internet protocol address and trusted internet domain routing information to the computing device over a trusted end-to-end communication link. The processing of block 216 may be performed while executing, at least in part, in a trusted security zone, for example a trusted security zone of a dynamic host configuration protocol server. The trusted internet protocol address is one of a plurality of trusted internet protocol addresses that are not accessible to computing devices that are not coupled to a trusted internet domain, and the trusted internet domain routing information comprises trusted internet protocol addresses of trusted network nodes that promote routing in the trusted internet domain, for example a trusted domain name system server. In an embodiment, each of a plurality of hosts and/or mobile devices coupled to the trusted internet domain is configured with a trusted internet protocol address. The trusted internet protocol addresses may not be numerically adjacent to each other.

Figure 4:
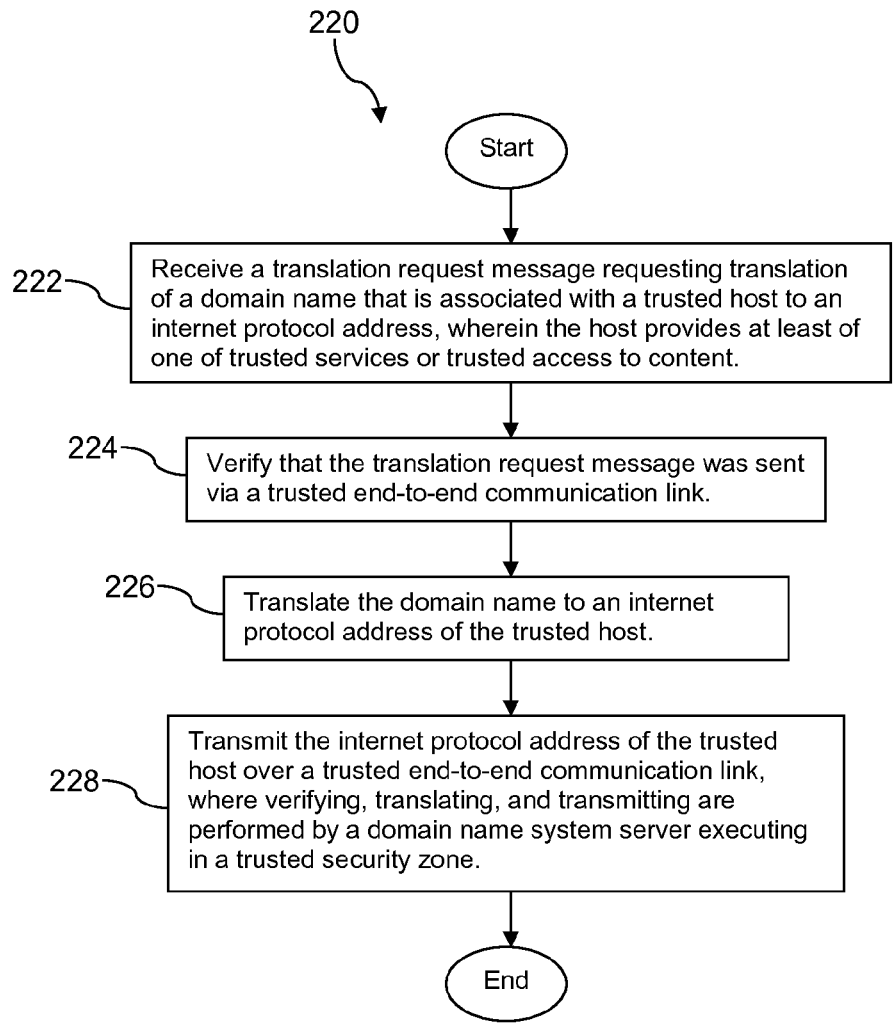
FIG. 4 is a flow chart of yet another method according to an embodiment of the disclosure.

Turning now to FIG. 4, a method 220 is described. At block 222, receive a translation request message requesting translation of a domain name that is associated with a trusted host to an internet protocol address, wherein the host provides at least one of one of trusted services or trusted access to content. At block 224, verify that the translation request message was sent via a trusted end-to-end communication link. At block 226, translate the domain name to an internet protocol address of the trusted host. At block 228, transmit the internet protocol address of the trusted host over a trusted end-to-end communication link, where verifying, translating, and transmitting are performed by a domain name system server executing in a trusted security zone. In an embodiment, the internet address of the trusted host is a trusted internet protocol address. It is understood that the method 220 may be performed by a domain name system server that also performs domain name to internet protocol translations sent by mobile devices and/or host computers that are not executing in a trusted security zone and hence comprise normal and/or untrusted domain name translation requests.

Figure 5:
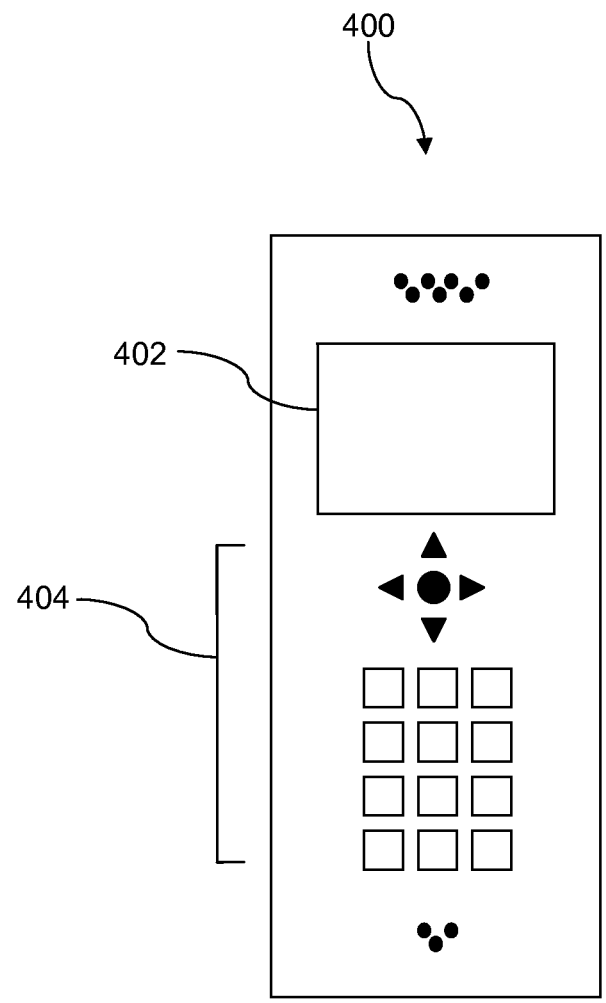
FIG. 5 is an illustration of a mobile device according to an embodiment of the disclosure.

FIG. 5 depicts a mobile device 400, which is operable for implementing aspects of the present disclosure, but the present disclosure should not be limited to these implementations. For example, in at least one embodiment, the mobile device 102 may be implemented in a form substantially similar to that of the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
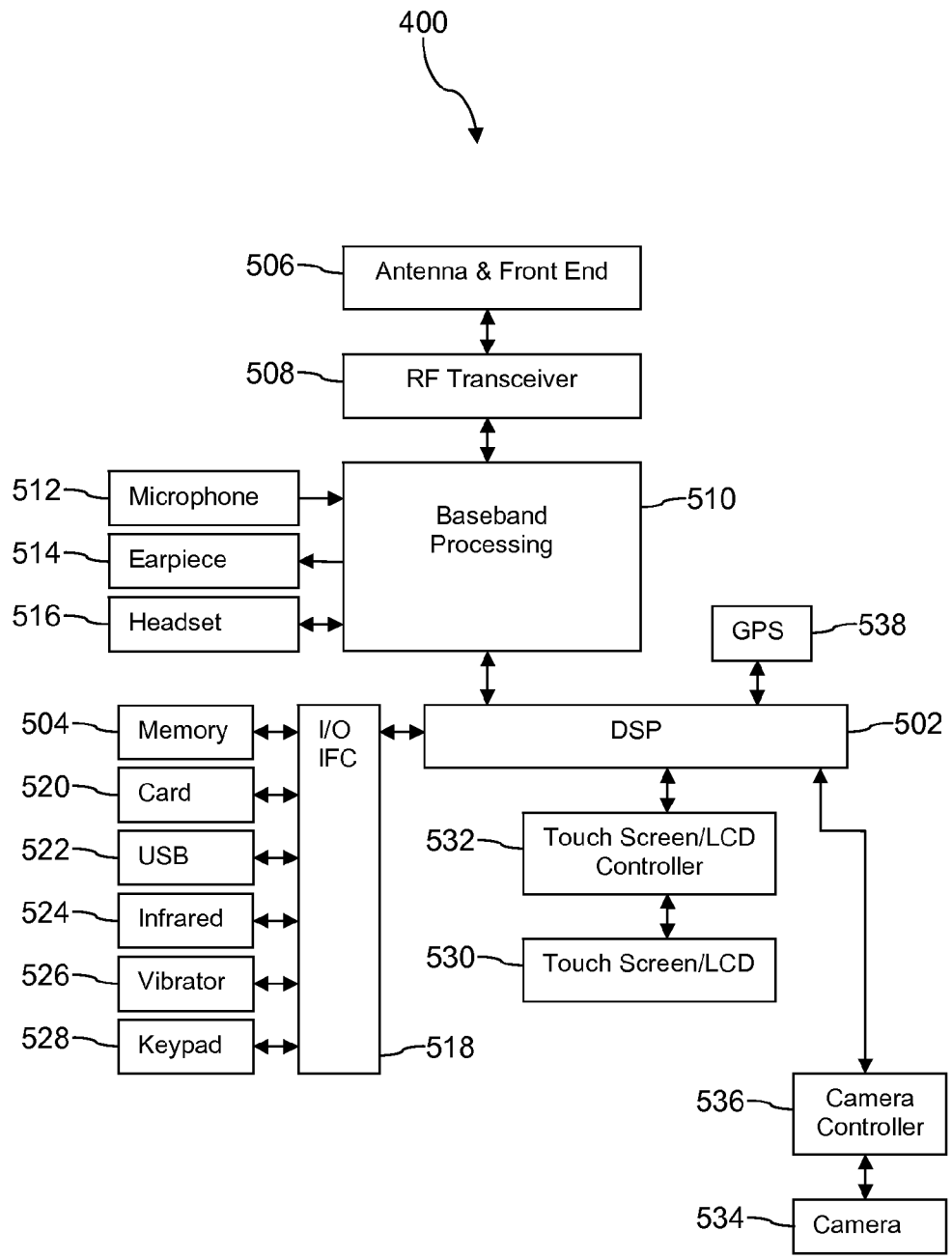
FIG. 6 is a block diagram of a hardware architecture of a mobile device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
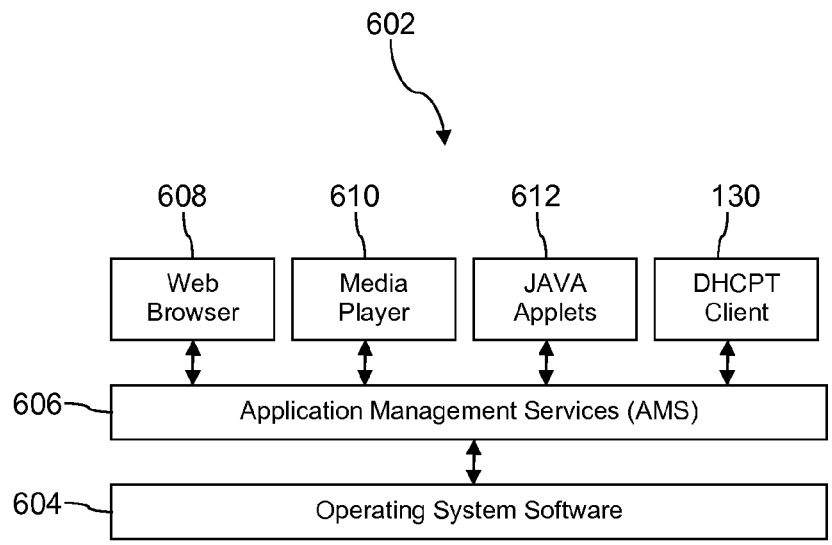
FIG. 7A is a block diagram of a software architecture of a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, JAVA applets 612, and the trusted dynamic host configuration protocol client 130. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The trusted dynamic host configuration protocol client 130 is described further above with reference to FIG. 1.

Figure 7B:
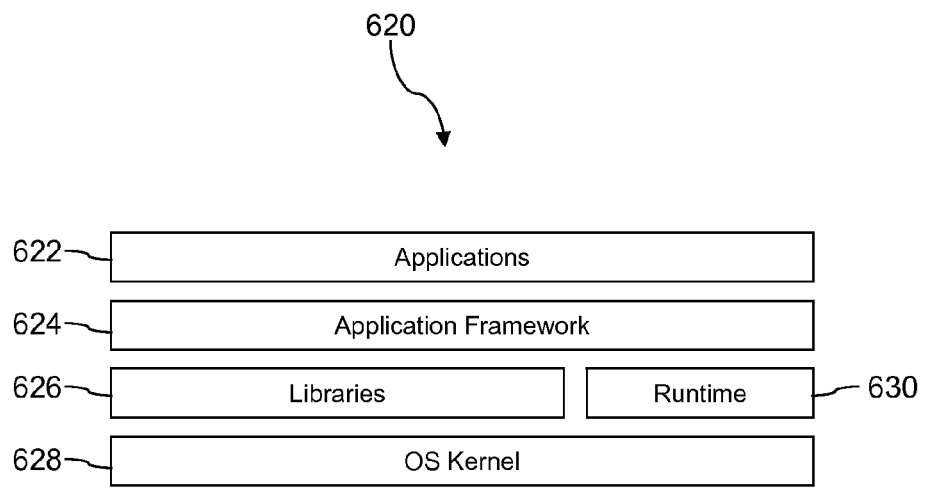
FIG. 7B is a block diagram of another software architecture of a mobile device according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
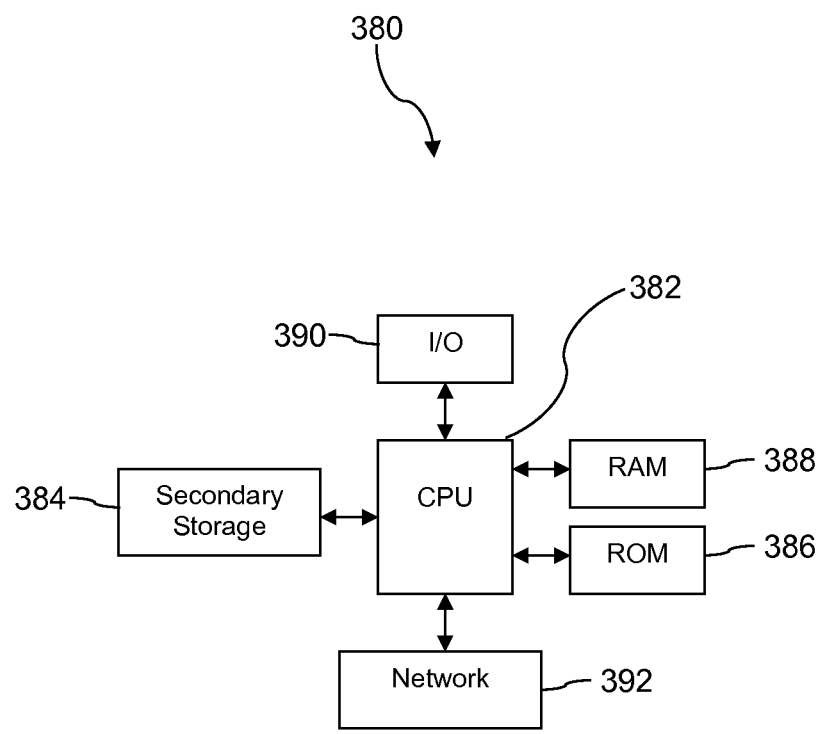
FIG. 8 is a block diagram of a computer system according to an embodiment of the disclosure.

FIG. 8 illustrates a computer system 380 suitable for implementing one or more embodiments disclosed herein. For example, the host computer 110, the trusted content server 120, the trusted dynamic host configuration protocol server 116, and the domain name system server 126 may be implemented as computer systems substantially similar to computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media.

The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing a trusted dynamic host configuration protocol (DHCPT), comprising:

receiving a trusted dynamic host configuration protocol request message and a trust token associated with the request message from a computing device, wherein the request message was created in and transmitted from a trusted security zone of the computing device, wherein the request message requests a trusted internet protocol (IP) address and trusted internet domain routing information for the computing device, and wherein the trusted security zone of the computing device is implemented in a processor chipset of the computing device and the trusted security zone of the computing device comprises a trusted execution environment and a secure partition of hardware and software resources;

in response to determining the computing device has the trusted security zone and in response to confirming a continuity of trust of the request message based on examining the trust token associated with the request message to verify the trust token associated with the request message was created in and transmitted from the trusted security zone of the computing device, allocating a trusted internet protocol address and determining trusted internet domain routing information for the computing device, wherein the allocating and determining are performed by a dynamic host configuration protocol server executing in a trusted security zone of the server; and transmitting a response message comprising the trusted internet protocol address and trusted internet domain routing information and a trust token associated with the response message to the computing device over a trusted end-to-end communication link, wherein a continuity of trust of the response message is confirmed based on examining the trust token associated with the response message before the computing device is configured based on the response message, wherein the trusted internet protocol address is one of a plurality of trusted internet protocol addresses that are not accessible to computing devices that are not coupled to a trusted internet domain, and wherein the trusted internet domain routing information comprises trusted internet protocol addresses of trusted network nodes that promote routing in the trusted internet domain, receiving a non-trusted dynamic host configuration protocol request message from a second computing device; and in response to determining the non-trusted request message was not created in and sent from a trusted security zone of the second computing device, sending an invitation to send a trusted dynamic host configuration protocol request message, to the second computing device, or transmitting a second internet protocol address and second routing information to the second computing device over a non-trusted communication link.

2. The method of claim 1, wherein each of a plurality of hosts coupled to the trusted internet domain is configured with trusted internet protocol addresses.

3. The method of claim 1, wherein the trusted internet protocol addresses are not numerically adjacent.

4. The method of claim 1, wherein the trusted internet domain routing information comprises a trusted internet protocol address associated with a trusted domain name system (DNST) server that translates both trusted internet domain names and normal internet domain names.

5. The method of claim 1, wherein the trusted internet domain routing information comprises a trusted internet protocol address associated with a trusted domain name system (DNST) server that translates trusted internet domain names and that does not translate normal internet domain names.

6. The method of claim 1, wherein the trusted security zone of the server comprises a trusted execution environment and a secure partition of hardware and software resources.

7. A method of performing a trusted dynamic host configuration protocol (DHCPT), comprising:

receiving a trusted dynamic host configuration protocol request message and a trust token associated with the request message from a computing device, wherein the request message was created in and transmitted from a trusted security zone of the computing device, wherein the request message requests an internet protocol (IP) address and routing information for the computing device, and wherein the trusted security zone of the computing device is implemented in a processor chipset of the computing device and the trusted security zone of the computing device comprises a trusted execution environment and a secure partition of hardware and software resources;

in response to determining the computing device has the trusted security zone and in response to confirming a continuity of trust of the request message based on examining the trust token associated with the request message to verify the trust token associated with the request message was created in and transmitted from the trusted security zone of the computing device, allocating an internet protocol address and determining routing information for the computing device, wherein the allocating and determining are performed by a dynamic host configuration protocol server executing in a trusted security zone of the server;

transmitting a response message comprising the internet protocol address and routing information and a trust token associated with the response message to the computing device over a trusted end-to-end communication link, wherein a continuity of trust of the response message is confirmed based on examining the trust token associated with the response message before the computing device is configured based on the response message;

receiving a non-trusted dynamic host configuration protocol request message from a second computing device; and in response to determining the non-trusted request message was not created in and sent from a trusted security zone of the second computing device, sending an invitation to send a trusted dynamic host configuration protocol request message, to the second computing device, or transmitting a second internet protocol address and second routing information to the second computing device over a non-trusted communication link.

8. The method of claim 7, wherein the internet protocol address is a trusted internet protocol address that is one of a plurality of trusted internet protocol addresses that are not accessible to computing devices that are not connected to a trusted internet domain.

9. The method of claim 8, wherein the routing information is trusted internet domain routing information that comprises trusted internet protocol addresses of trusted network nodes that promote routing in the trusted internet domain.

10. The method of claim 9, wherein the trusted internet domain routing information comprises the trusted internet protocol address of a trusted domain name system (DNST) server.

11. The method of claim 7, wherein the trusted security zone of the server comprises a trusted execution environment and a secure partition of hardware and software resources.

\* \* \* \* \*